P. M. Bristol,
Saw-Set,
Nº 82,078. Patented Sep. 15, 1868.
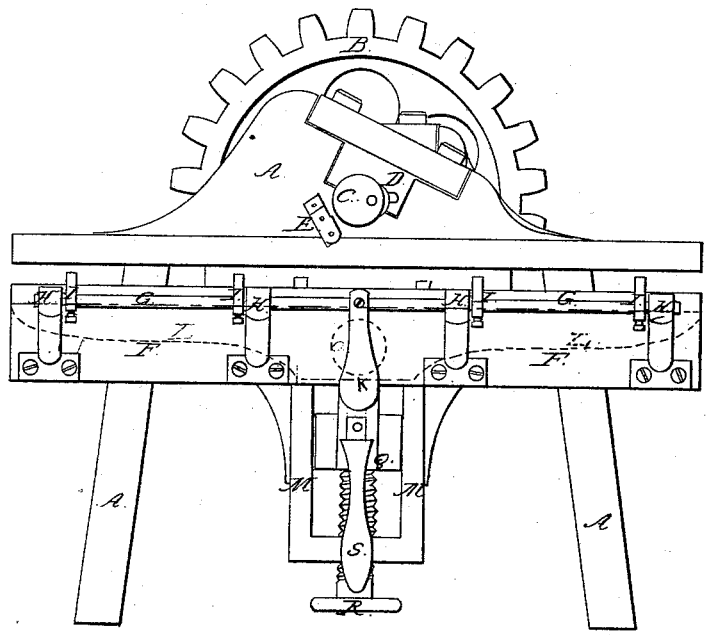
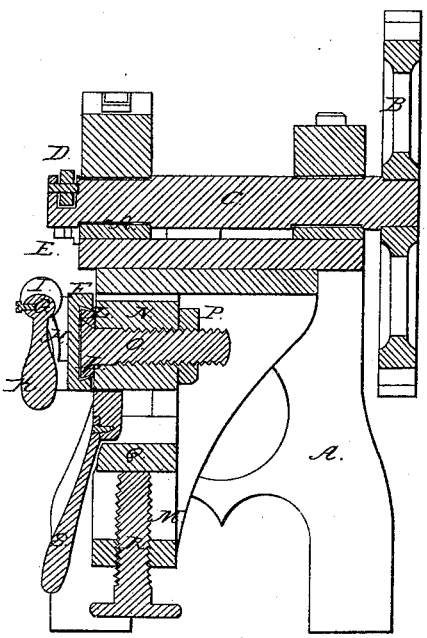
Witnesses.
Chas A Smith
Fred. White
Inventors.
P. M. Bristol
By his Atty
J B Smith

United States Patent Office.

P. M. BRISTOL, OF LUDINGTON, MICHIGAN.

Letters Patent No. 82,078, dated September 15, 1868.

---

IMPROVED SAW-SHARPENING DEVICE.

---

*The Schedule referred to in these Letters Patent and making part of the same.*

---

TO ALL WHOM IT MAY CONCERN:

Be it known that I, P. M. BRISTOL, of Ludington, in the county of Mason, and State of Michigan, have invented a new and useful Improvement in Machines for Swaging, Jointing, and Sharpening Saws; and I do hereby declare that the following is a full, clear, and exact description thereof, which will enable those skilled in the art to make and use the same, reference being had to the accompanying drawing, forming part of this specification, in which—

Figure 1 is a side view, and

Figure 2 a transverse sectional view.

Similar letters of reference in each of the figures indicate corresponding parts.

The object of my invention is to provide a machine for swaging the points of saw-teeth, bringing them to an edge, and cutting off any over-length of tooth, sharpening and jointing a saw in a perfect manner.

A is the frame; B, cog-wheel; C, shaft; D, a wheel in the end of shaft C for swaging saw-teeth; E, rest for the hooking side of a saw-tooth to rest on when the swaging-wheel is turned on to it. This rest has a square shoulder, over which the point of a tooth, if too long, will project, and be cut off by the wheel D. F, a sliding carriage to hold a saw to be swaged; G, an eccentric-shaft; H H H H, brackets on carriage F, supporting shaft G; I I I I, eccentrics on shaft G, with which to hold a saw; K, handle with which to operate eccentrics I; L, slide for carriage F, fitting into a dove-tail groove in the carriage. This slide is indicated by red dotted lines in fig. 1. M, hanger secured to the top of frame A; N, a sliding block fitting in grooves in hanger M. O, bolt which secures slide L in position; P, nut on bolt O; Q, a sliding block under block N, fitting into the same grooves in hanger M; R, a screw with which to adjust block N; S, a lever having its fulcrum in block N. With this lever, carriage F is raised and lowered for the purpose of bringing the teeth of a saw into the swaging-apparatus to be operated on.

Operation.

Handle K is pressed down, throwing the eccentrics I back. Then place the back of a mill-saw between the eccentrics I and the carriage F. Then raise handle K; this will press the eccentrics against the saw, pinching it against the carriage, holding it firmly with its teeth up. Then with screw R adjust block Q so that when the handle of lever S is raised, the teeth of the saw will clear the swaging-wheel D when shaft C is revolving. Put shaft C in motion by any suitable means, and as it revolves, wheel D, in its end, will at each revolution come in contact with the rest E, at the upper end of its face, where the shoulder is formed. Then adjust carriage F so that the hook of the teeth in the saw shall be parallel with the face of rest E. This is done by raising one end of slide L, tilting it on bolt O. Then press down the end of lever S, which will raise carriage F, bringing a tooth between rest E and shaft C, and as the shaft revolves, wheel D is brought in contact with the back of the tooth, and rolls on towards its point, drawing it to a proper taper and swaging it out. When wheel D has reached the shoulder in rest E, if any portion of the tooth projects beyond that point, the wheel, coming in contact with the sharp edge of the shoulder, cuts it off and makes a sharp point to the tooth. If the tooth is too blunt it is drawn out. When one tooth has been operated on, lower the saw, and slide the carriage F along and swage the next, and so on till all the teeth are put in order. The rest E and wheel D are made of suitable metal for the purpose.

This mode of putting saws in order, I apply to circular as well as straight saws.

I do not claim the various parts of the machine described; but

What I claim as my invention, and desire to secure by Letters Patent, is—

The swaging-apparatus, consisting of shaft C, wheel D, and rest E, arranged and combined substantially as described.

P. M. BRISTOL.

Witnesses:
F. J. DOWLAND,
AXEL NELSON.